United States Patent [19]

Bratten

[11] Patent Number: 5,565,112
[45] Date of Patent: Oct. 15, 1996

[54] METHOD FOR RETROFITTING FILTERS WITH PERMANENT FILTER MEDIA BELT

[75] Inventor: Jack R. Bratten, West Bloomfield, Mich.

[73] Assignee: Filtra-Systems Company, Southfield, Mich.

[21] Appl. No.: 262,145

[22] Filed: Jun. 20, 1994

[51] Int. Cl.⁶ ........................................... B01D 33/00
[52] U.S. Cl. ..................... 210/780; 210/791; 210/387; 34/480; 242/556; 242/557; 242/562.1
[58] Field of Search ..................... 422/24, 186.3; 34/82, 480; 242/557, 562.1, 563.1, 534.2, 564.4, 538.2, 555.4, 555.3, 556; 210/783, 780, 791, 387, 402, 406, 400

[56] References Cited

U.S. PATENT DOCUMENTS

| | | | |
|---|---|---|---|
| 1,930,074 | 10/1933 | Bentley | 242/557 |
| 2,333,239 | 11/1943 | Fleisher et al. | 242/557 |
| 2,736,434 | 2/1956 | Yacoe | 210/387 |
| 3,145,989 | 8/1964 | Cavrich | 242/557 |
| 3,527,698 | 9/1970 | Von Reppert et al. | 210/387 |
| 3,740,296 | 6/1973 | McDonald | 242/555.4 |
| 3,858,817 | 1/1975 | Riekkinen | 242/533.8 |
| 4,826,596 | 5/1989 | Hirs | 210/387 |
| 5,222,680 | 6/1993 | Barcomb et al. | 210/387 |
| 5,344,556 | 9/1994 | McEwen et al. | 210/387 |

Primary Examiner—Robert Popovics
Attorney, Agent, or Firm—John R. Benefiel

[57] ABSTRACT

An arrangement and method of retrofitting a filter using a disposable media to use a permanent media belt passed through a filter tank, in which movable carts are positioned at the entrance and discharge ends of the filter tank, and a roll of permanent filter media belt segment is unwound and passed through the filter tank and rewound into a roll on the other cart at the discharge end of the filter tank with the permanent filter media belt segment being cleaned and dried prior to being rewound. Upon complete rewinding of the segment, the movable carts are switched in their positions and the permanent filter media belt segment again unwound to be again passed through the filter tank with the process repeated. A second removable cart can also be positioned at the entrance side of the filter tank with the leading end connected to the trailing end of the previous belt segment automatically to be carried through the filter tank to ensure uninterrupted filter operation by successive feed of the two belt segments.

4 Claims, 4 Drawing Sheets

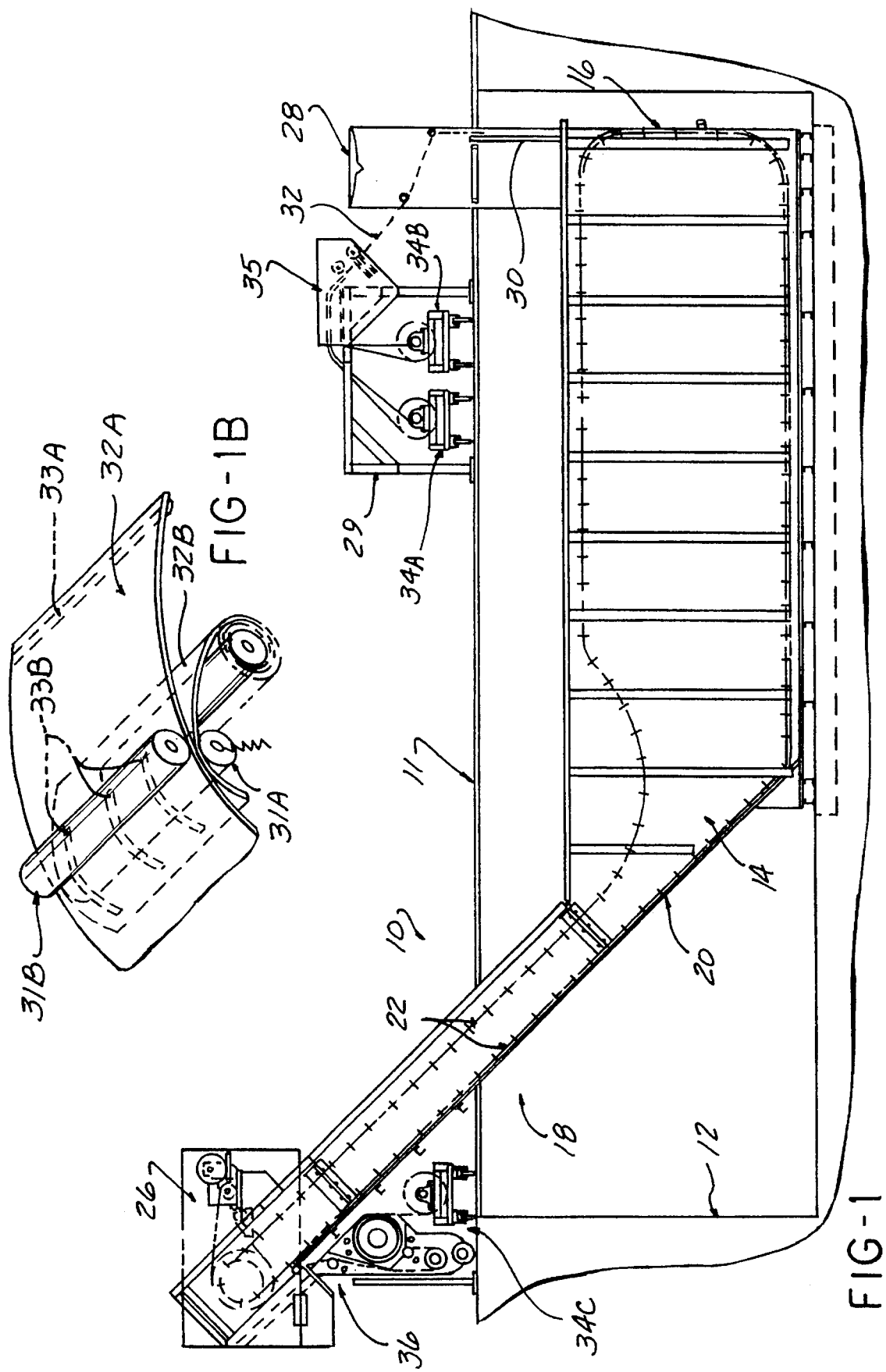

METHOD FOR RETROFITTING FILTERS WITH PERMANENT FILTER MEDIA BELT

BACKGROUND OF THE INVENTION

This invention concerns filter units of a type including a tank adapted to receive the liquid to be filtered and a filter media belt driven through the tank over a perforated plate. A vacuum box beneath the perforated plate induces liquid flow through the filter media belt to be filtered, the liquid collected in the vacuum box. Such filter units are in wide use in connection with the filtration of machine tool liquid coolant, in which cutting chips and other solid debris are filtered from the coolant prior to being recirculated back to the machine too.

Such filter units have utilized both a disposable media belt and a permanent or recleanable filter media belt. An example of a disposable media belt filter is shown in U.S. Pat. No. 4,774,010 issued on Sep. 27, 1988 for a "Tank Filter With Conveyor Flight Driven Filter Media Belt"; U.S. Pat. No. 4,396,505 issued on Aug. 2, 1983 for a "Filtration System Pump Arrangement"; and U.S. Pat. No. 5,089,143 issued on Feb. 18, 1992 for a "Method of Filtering Industrial Liquids and Apparatus Therefor".

In filters of this type, drag conveyor chain loops on either side of conveyor flights engage the edges of the disposable filter media belt to seal and advance the same through its path within the filter tank. The disposable media is introduced at one end of the filter tank, driven by the conveyor chain loops over the vacuum box to the discharge end of the tank, where it is collected for disposal.

There has heretofore also been developed filter units of this type having a "permanent" or recleanable filter media belt, which is recirculated after passing through the filter tank. See for example U.S. Pat. No. 4,514,301 issued on Apr. 30, 1985, for a "Continuous Media Filter". The arrangement shown in that patent comprises a permanent filter media belt which is attached to the drag conveyor chain to be recirculated therewith. The attachment between the drag conveyor chain and the permanent filter belt makes it more difficult to replace the filter media belt, increases the initial cost of the filter media belt, and makes the cleaning of the permanent filter media belt more difficult inasmuch as the drag conveyor includes flight bars connected to the conveyor chain loops and extending across and over the filter media belt to impede access thereto.

In copending application Ser. No. 07/813,161, filed Dec. 24, 1991, for a "Belt Filter" there is described an arrangement for a recirculation of a permanent filter media belt driven only by a frictional engagement with the drag conveyor chain loops by recirculation of the filter media belt beneath the filter tank. This leaves the outer surface of the filter media belt accessible for thorough cleaning thereof during its recirculation and also allow the optional use of the disposable filter media by introduction between the permanent filter media belt and the chain loops of the conveyor.

See also U.S. Pat. No. 5,118,420 issued on Jun. 2, 1992, for "Self Cleaning Vacuum Filter Particularly For Filtering Industrial Lubricants and coolants" in which a permanent filter media belt is recirculated below the vacuum box but within the filter tank.

In recent years, the use of disposable filter media has become less desirable as the used disposable filter media may be loaded with entrapped contaminants which must be disposed of using special precautions and may not be able to be deposited in an open land fill. This significantly increases the costs of operation.

Accordingly, the use of permanent filter media has become more attractive to users of this equipment.

Inasmuch as these tank-type filter units are often placed below grade in pits, the retrofitting of disposable filter media filter units would be impractical where the permanent filter media belt is recirculated beneath the tank as described in the aforementioned copending U.S. patent application, and would add undue complexity to the equipment.

Accordingly, it is the object of the present invention to provide an arrangement and method for retrofitting tank filters with permanent filter media belts without increasing the complexity of the equipment or incurring excessive cost in the retrofit.

SUMMARY OF THE INVENTION

The present invention comprises an arrangement and method in which first and second media belt segments are repeatedly driven through the tank. A series of movable filter media roll support carts are employed, each cart having a roller shaft on which may be wound a long segment of permanent media belt. Two of the carts are positioned at the entrance end of the tank with a first permanent media belt segment unwound and passed into the tank entrance end such as to be engaged by the drag conveyor chain loops to be frictionally driven through the filter tank.

A short length of a second permanent filter media belt segment from a second roll revolvably supported on the other cart is also unwound to be overlapped by the filter media belt segment advanced from the first roll, but the second segment is not engaged by the conveyor chain loops initially so as to not be advanced into the tank, but is held in reserve until the first belt is completely unwound.

A third movable roll support cart is also provided located at the discharge end of the tank, the third cart holding a roller shaft acting as a permanent filter media belt rewinder. A permanent filter media belt cleaning and drying assemblage receives the first filter media belt segment after it exits the discharge end of the tank. The permanent filter media belt is thoroughly washed on both sides and passes over an air drying cage with supplemental electric heating element and ultraviolet sterilizing lamp also optionally used.

The cleaned and dried first permanent filter media belt segment is rewound on the roller shaft supported on the third roll support cart, the shaft constantly urged to rotate in a rewind direction by an air motor so as to exert a rewinding tension on the filter media belt segment, causing the belt segment to be rewound as it is incrementally indexed out of the cleaning-drying assemblage.

The diameter of the rewound roll is constantly monitored, and when it approaches a fully rewound condition, an alarm indication is displayed or sounded at the same time as the final length of the first permanent filter media segment passes off the roller shaft on the first cart at the entrance end of the tank.

VELCRO™ (i.e. hook and loop fasteners) strips on the respective trailing and leading ends of the first and second permanent media belt segments on the first and second carts are pressed into engagement by passing between rollers to connect the respective permanent filter media belt first and second segments together. The second permanent filter media belt segment thus begins to be unwound, by advance of the trailing end of the permanent filter media belt first segment, advancing the second segment through the tank, out the discharge end and through the belt cleaning and drying assemblage.

At this point, the now empty first cart from the entrance end of the tank and the third cart supporting the rewound permanent filter media belt segment at the discharge end are switched in their respective positions. The lead end of the permanent filter media belt second segment is attached to the empty roller shaft on the media cart formerly located at the entrance end to initiate rewinding of the permanent filter media belt second segment now exiting the cleaning and drying assemblage.

At the same time, the rewound permanent filter media belt first segment is unwound sufficiently to be positioned overlapping the second belt at the entrance end of the filter tank but without being driven therein until complete unwinding of the second permanent media belt causes a repeat of the steps described above.

This system and method allows retrofitting of a filter with a permanent filter media belt of an existing filter unit utilizing a disposable media without substantial modification.

The length of each permanent filter media belt segment held by each of the media roll carts is sufficient to enable several days of normal filter operation before a replacement cycle is necessitated such as to not increase the operating labor appreciably.

DESCRIPTION OF THE DRAWINGS

FIG. 1 is a side elevational view of a below grade tank filter according to the invention with the movable permanent media belt roll support carts located at the entrance and discharge ends of the tank together with the permanent filter media belt cleaning and drying assemblage.

FIG. 1B is a fragmentary perspective view of the respective trailing and leading ends of a pair of permanent filter belt segments showing the attached hook and loop connecting strips.

DETAILED DESCRIPTION

Figure 1A:
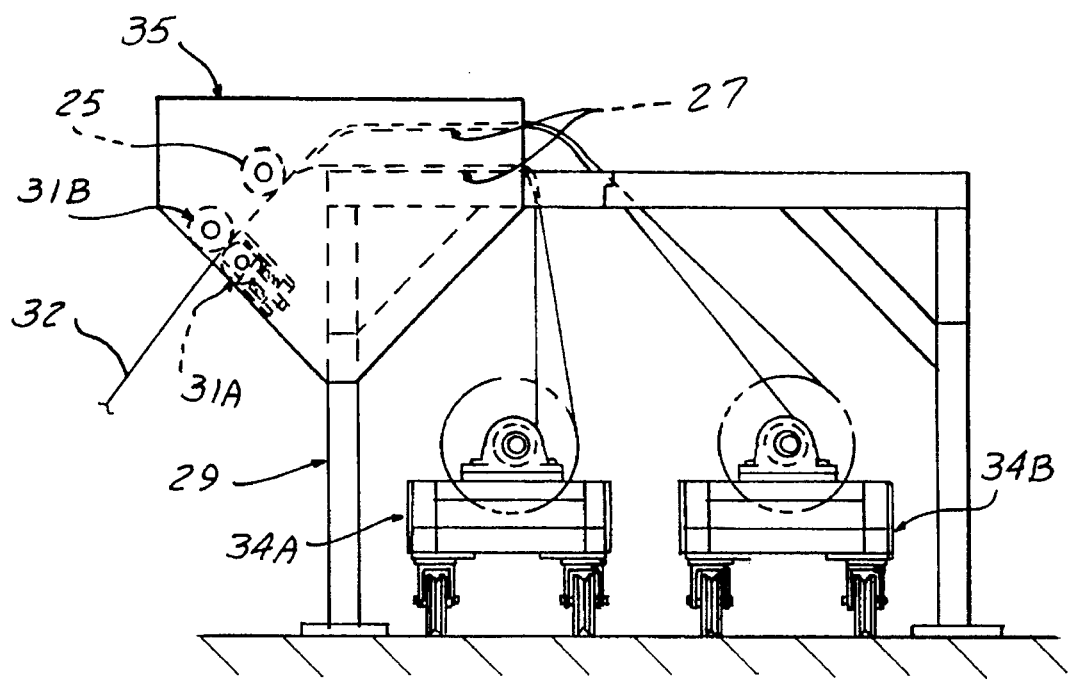
FIG. 1A is a fragmentary side elevational view of the filter tank shown in FIG. 1 showing an alternate arrangement of the permanent media roll support carts at the entrance end of the filter tank.
Figure 3:
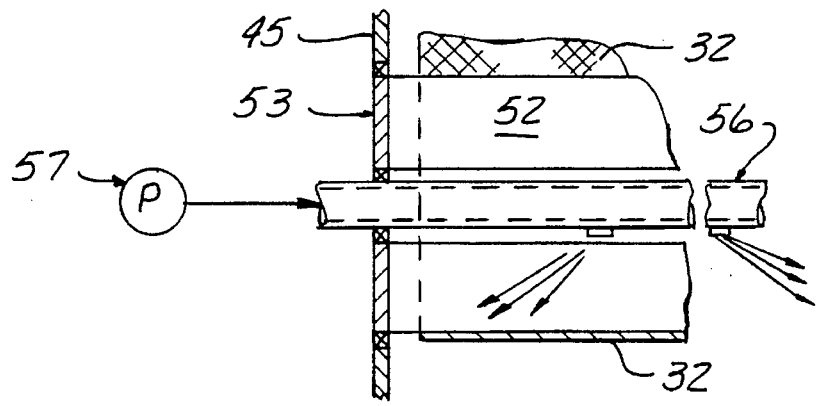
FIG. 3 is a fragmentary sectional view of one end of the vane cylinder and inside spray header included in the media belt cleaning and drying assemblage shown in FIG. 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, a filter 10 for receiving liquid to be filtered is shown located in a below-grade pit 12. Such below grade installation is typical for industrial installations of such filters with a steel cover plate 11 overlying the pit. The filter includes a tank 14 adapted to receive liquid coolant to be filtered, the tank 14 having an entrance end 16 defined by a vertical forward wall, and also a discharge end 18 defined by a sloping rear wall 20, each of which extending above the top of the pit 12. A drag conveyor 22 recirculates through interior of the tank 14, descending down the entrance forward wall 16 across the tank bottom over a vacuum box 24, up the inclined rear wall 20 and returning across the top of the tank.

The conveyor 22 includes a pair of laterally spaced chain loops connected to flights 23 (FIG. 2), and a drive mechanism 26 is provided above the upper portion of the rear wall 20 engaging the conveyor chain loops to drive the conveyor 22 through its recirculating path. Such filters are conventionally operated with the use of a strip of disposable filter media as described above which is fed off a roll supported in a cradle 28 located above the entrance end of the tank. The media is introduced forward of a vertical partition 30 extending down the forward wall 16. The weight of the chain loops and flights 23 of the drag conveyor 22 lying across the tank bottom and up the inclined wall 20 bears on the edges of the filter media strip to seal the same and create a frictional engagement to carry the filter media strip 32 through the tank as the drag conveyor 22 is periodically indexed.

According to the concept of the present invention, the filter 10 is retrofitted to use a permanent filter media belt by successively introducing two separate segments 32A, 32B of permanent filter media belts 32 into the filter, causing each of the segments 32A, 32B to be successively driven through the filter tank 14 and then cleaned and rewound into a roll and reused in a succeeding period of operation of the filter 10.

This is accomplished by an arrangement including a first filter media roll support cart 34A and a second media roll support cart 34B both located at the entrance side of the filter 10. A third filter media roll support cart 34C is located at the discharge end of the filter 10 which serves to collect a respective permanent media belt segment 32A, 32B after being cleaned and dried in a cleaning and drying assemblage 36 located at the discharge end of the filter tank 14.

The first and second filter media roll support carts 34A, 34B may be located outboard of the pit 12 as shown in FIG. 1 or alternatively, where such space is not available, the first and second carts 34A, 34B may be located supported on the heavy steel plate cover 11 normally installed over the pit 12 as shown in FIG. 1A.

According to the concept of the present invention, a first permanent filter media belt segment 32A is unwound off a roll support shaft on the filter media roll support cart 34A, advanced through the tank 14 and automatically rewound on a roll support shaft on the third filter media support cart 34C as the filter media is indexed to cause incremental lengths of the permanent media belt 32 to be advanced out of the tank 14.

After the roller shaft on cart 34C has received most of the length of the first permanent filter media segment 32A, the leading edge of the second filter media belt segment 32B on cart 34B becomes affixed to the trailing end of the first permanent filter media belt segment 32A as it passes into the tank 14. This connection is accomplished by means of a suitable pressure engaged attachment, such as established by strips of a hook and loop or VELCRO™ type securement 33A, 33B as shown in FIG. 1B, compressed together by a spring loaded rollers 31A urged against a fixed roller 31B. The roller set 31A, 31B is part of a media belt guide fixture 35 mounted on a stationary support frame 29 located at the entrance end of the tank 14, within which the first and second carts 34A, 35B are positioned. Guide surfaces 27 and opposing roller 25 are also included in the media belt guide fixture 35 (FIG. 1A).

As the first segment rewind on the roll support shaft of the third cart 34C approaches completion, this condition is sensed by a detector 35, which can trigger a signal to provide an indication to maintenance personnel. After the trailing end of the first permanent filter media belt segment passes out of the cleaning and drying assemblage 36, the connected belt ends are separated manually, and the third media roll support cart 34C is then moved to the entrance end of the tank 14. The empty media roll support cart 34A is removed and placed in the rewind position at the discharge end of the tank 14. The leading edge of the second media segment 32B is attached with VELCRO™ strips 33B to the roll support shaft of the first cart 34A.

The leading edge of the next successive belt segment is affixed to the roll shaft so that rewind onto relocated cart 34A proceeds.

The rewound, cleaned, and dried filter media belt segment 32A on the cart 34C is positioned adjacent the remaining cart 34B off which the second filter media belt segment 32B is being unwound and the above described procedure repeated.

Each of the filter media belt segments 32A, 32B is preferably at least one hundred yards in length such that with normal indexing cycles, the carts 34A, 34B, 34C would only have to be moved at intervals of several days to a week in a typical installation.

Figure 2:
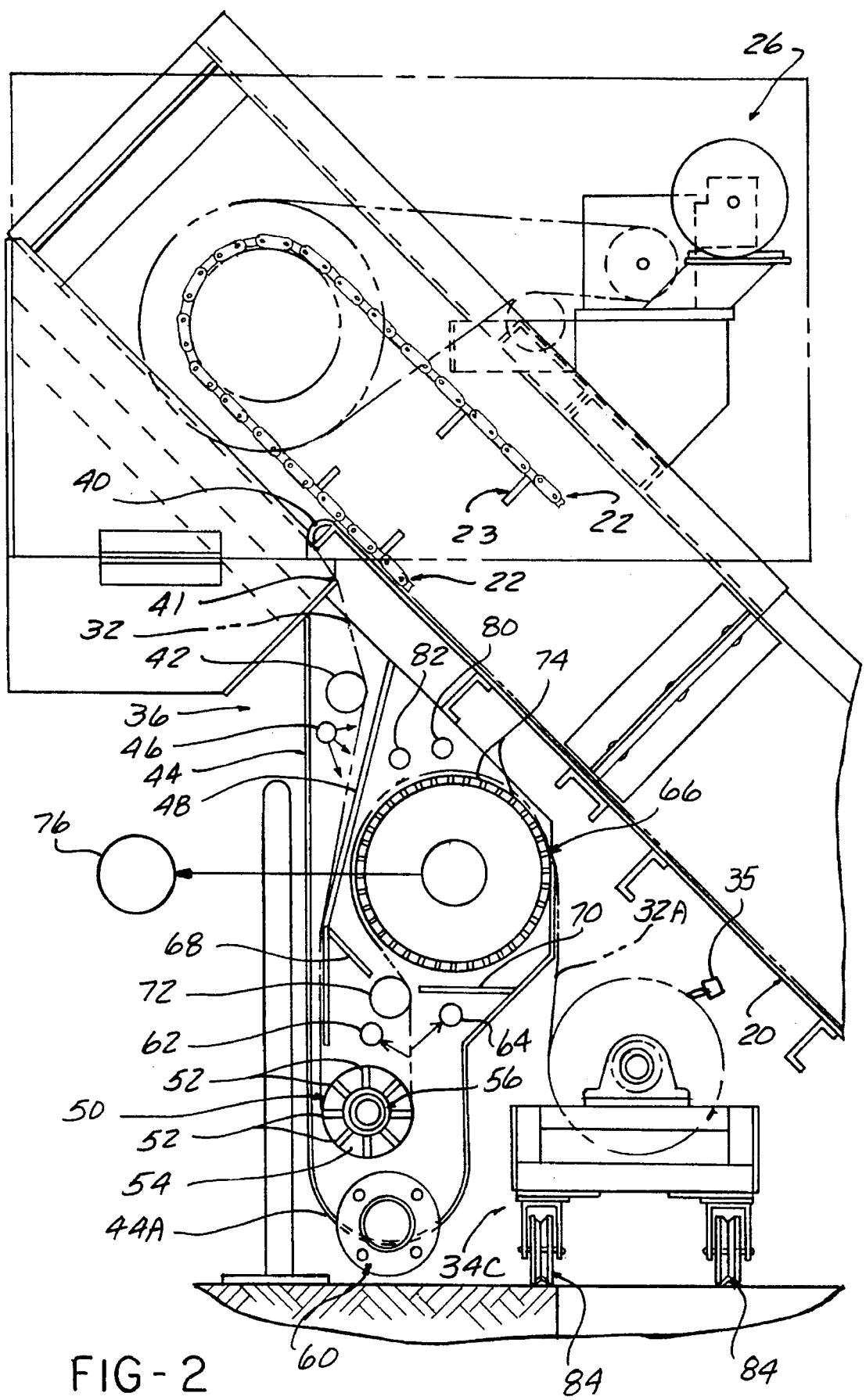
FIG. 2 is an enlarged elevational view of the discharge end of the filter tank shown in FIG. 1, showing the details of a permanent filter media cleaning and drying assemblage, as well as the permanent media roll support cart at the rewind location.

FIG. 2 shows in greater detail the cleaning and drying assemblage 36. The permanent filter media belt segment 32A passes out the discharge end 18 around a guide edge 40 located within a sheet metal enclosure 44 housing the cleaning and drying components.

A scraper edge 41 at the top of a discharge chute causes the filtered out solids to be scraped off the upper surface of the permanent filter media belt segment 32, passing down to a collection conveyor (not shown). A header pipe located exteriorly to the upper outer surface of the permanent filter media belt segment 32A directs a series of high pressure jets at the entire upper or outer surface of the filter media belt segment 32.

The permanent filter media belt segment 32A then passes over a partition 48, moving outwardly and thence around a rotatable vane cylinder 50 comprised of a series of radial vanes 52 affixed to end discs 53. The filter media belt segment 32A is wrapped around the outside edges of the vanes 52 to form a series of trough like spaces 54 between the vanes 52. End discs 53 are rotatably supported in the wall 45 of enclosure 44 to allow the segment 32A to be freely advanced.

An inside header pipe 56 extends within the vaned cylinder 50, passing out wall 45 to allow connection to a pump 57 supplying pressurized filtered liquid to oppositely directed jet nozzles 58 and 60 which direct an oblique spray directed towards either edge of the filter media belt segment 32. This arrangement allows the cleaning of the inside surface of the filter media belt segment 32A without requiring the filter media belt segment 32A be directed through a reverse path to thus save space and to simplify the design.

The enclosure 44 also has a trough shape on its lower end 44A as shown, and a suitable drain fitting 60 is provided receiving the collected liquid to be recirculated to the tank.

Secondary flushing lower pressure headers 62, are also provided flushing the belt 32 both in the inside and the outside with fresh water to carry off any soluble material such as "tramp" oil which may remain after high pressure cleaning with the jets of filtered coolant supplied through header pipes 46 and 56.

A dryer cage 66 is also provided confined within partitions 68, 70 forming a drying compartment. The permanent filter media belt 32 passes into the drying compartment after passing over guide roller 72. The dryer cage 66 comprises a series of spaced apart radial plates 74 allowing air to be drawn in through the belt as it is wrapped around the exterior of the dryer cage 66. A suitable inflow of drying air to the inside of the cage 66 is induced by a fan 76 and suitable ducting (not shown). An external radiant heater 80 may also be provided to augment the drying effect. An ultraviolet lamp 82 may also be provided to kill any bacterial growth on the filter media belt segment 32A.

The filter media belt segment 32A passes off the exterior of the dryer cage 66 and is wound onto a roll support shaft on the cart 34C at the rewind location.

Each of the carts 34A, 34B, 34C are substantially identical in construction, which may be a welded structure supported on caster wheels 84 which are received over angle bar guides 86 anchored to the supporting floor structure such as to maintain the side-wise position of the cart.

Figure 4:
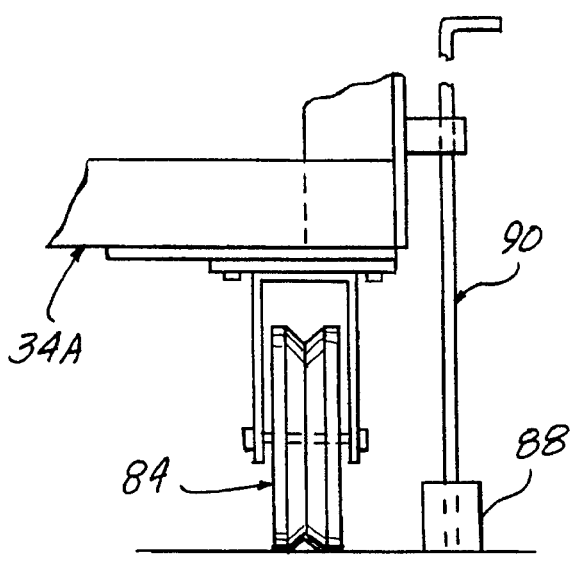
FIG. 4 is a fragmentary elevational view of the one corner of a permanent filter media roll support cart showing the engagement of a caster wheel with an angled floor guide and a locator dead bolt arrangement.
Figure 5:
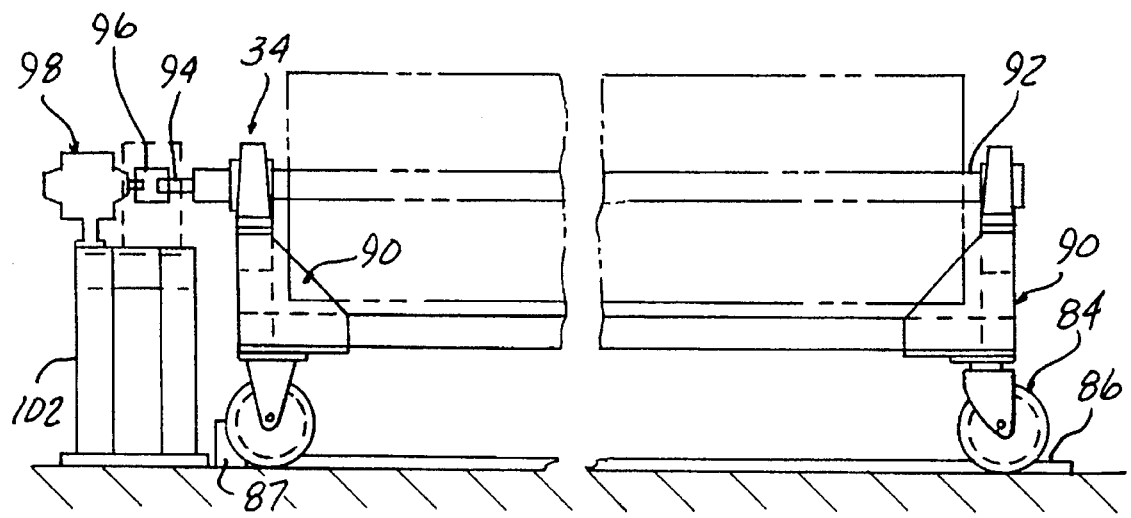
FIG. 5 is a side elevational view of a permanent filter media roll support cart.
Figure 6:
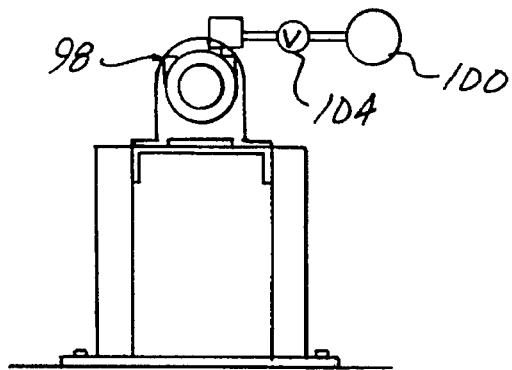
FIG. 6 is an end view of a permanent media roll rewinder air motor and supporting stanchion.
Figure 7:
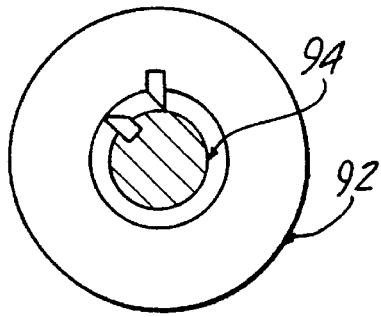
FIG. 7–9 are enlarged views of alternate forms of couplings between the media roll support shaft for coupling between the air motor and one end of a roll support shaft to establish a rotary connection therebetween.
Figure 8:
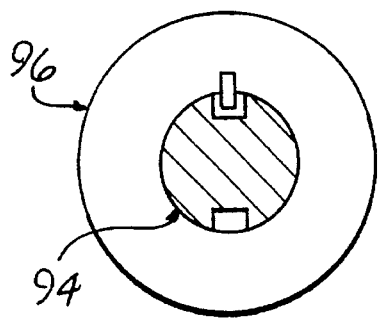
Figure 9:
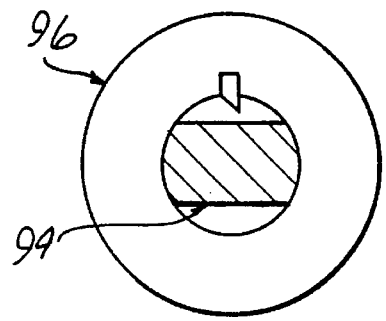

An abutment 87 locates the cart 34 in an endwise position, and an anchor socket 88 may be provided, FIG. 4, affixed to the floor and receiving a metal locator rod 90 to insure that the cart remains in position against abutment 87, as seen in FIG. 5.

Each media roll support cart 34 includes end brackets 90 at each end which receive and rotatably support the roll support shaft 92.

Each roll support shaft 92 has a hook or loop strip (VELCRO™) for securing a leading end of a filter media belt segment to start rewinding. At one end, each roll support shaft 92 has a projecting drive portion 94 which is adapted to be received in a coupling 96 driven by an air motor 98 supplied from a source of air pressure 100.

The air motor 98 is supported on a pedestal 102 at the rewind station only. As shown in FIG. 5, 7, 8, and 9, the drive end 94 may take various configurations each adapted to allow engagements with coupling 96 as the cart 34 is rolled into position against abutment 87.

A valve 104 allows manual turning on and off of air supply to the air motor 98 during the change over of a filter media belt roll.

Accordingly, it can be appreciated that by this arrangement and method, an existing filter of this type can be retrofitted for use with a permanent media belt without any need for substantial modification to minimize the time and expense involved in such change over. At the same time, the labor involved in operating the filter is minimal and the operational reliability of the filter will remain high.

I claim:

1. A method for retrofitting a filter comprised of a disposable non-reusable filter media belt directed through a filter tank from an entrance end of said filter tank to a discharge end of said filter tank, comprising the steps of:

feeding a segment of a recleanable permanent filter media belt from a wound roll supported on a first movable cart at said entrance end of said filter tank;

positioning a second movable cart having a second permanent media belt segment wound into a roll thereon at said entrance to said filter tank;

driving said first permanent filter media belt through said filter tank to said discharge end;

cleaning said first permanent filter media belt after passing out of said filter tank so as to be able to be reused;

rewinding said cleaned permanent filter media belt segment into a third roll located at said discharge end of said filter tank and supported on a third movable cart; and connecting said second permanent filter media belt segment leading end to a trailing end of said first permanent media belt segment as said trailing end passes into said filter tank to thereby carry said second permanent filter media belt segment through said tank;

switching the positions of said first and said third movable carts after said permanent filter media belt segment has become fully wound into a roll on said third cart; and, cleaning and rewinding said second permanent filter media belt segment from said roll on said second cart into a roll on said repositioned first movable cart;

repeatedly switching positions of said first, second, and third movable carts as said first and second permanent filter media belt segments are successively rewound on said respective movable carts.

2. The method according to claim 1 further including the step of cleaning said first permanent filter media belt by washing, and drying said washed first permanent filter media belt segment after passing out of said discharge end of said filter tank but prior to being rewound into a roll on said movable cart.

3. The method according to claim 1 wherein a trailing end of said second permanent filter media belt segment is partially introduced into said entrance end of said filter tank so as to overlie said first mentioned permanent filter media belt segment as said permanent media belt segment is driven through said filter tank past said leading end thereof and further including the step of interconnecting said leading end of said second permanent filter media belt segment to said trailing end of said first mentioned permanent media belt segment as said trailing end passes over said leading end of said second permanent filter media belt segment.

4. The method according to claim 3 further including the step of disconnecting said trailing end of said first mentioned permanent filter media belt segment from said leading end of said second permanent filter media belt segment as said trailing end is wound into a roll on said another cart.

\* \* \* \* \*